United States Patent [19]
Aron

[11] Patent Number: 4,953,346
[45] Date of Patent: Sep. 4, 1990

[54] TRACTOR DRIVEN FARM MACHINE

[75] Inventor: Jerome Aron, Bouxwiller, France

[73] Assignee: Kuhn S.A., Saverne, France

[21] Appl. No.: 354,832

[22] Filed: May 22, 1989

[30] Foreign Application Priority Data

May 26, 1988 [JP] Japan ............................. 88 07194

[51] Int. Cl.⁵ .............................................. A01D 69/06
[52] U.S. Cl. ................................. 56/11.1; 56/DIG. 6; 74/665 B; 74/670; 173/25
[58] Field of Search .................. 56/10.1, 14.7, DIG. 6, 56/10.3, 10.8, 11.1; 74/665 B, 670, 384, 395, 397; 172/72; 173/25–27

[56] References Cited

U.S. PATENT DOCUMENTS

| 2,590,675 | 3/1952 | Bottorff | 74/397 |
| 3,426,610 | 2/1969 | Scharer | 74/397 |
| 4,133,216 | 1/1979 | Gentile et al. | 74/384 |
| 4,601,348 | 7/1986 | Cox | 173/26 |

FOREIGN PATENT DOCUMENTS

| 0063531 | 10/1982 | European Pat. Off. . |
| 0155063 | 9/1985 | European Pat. Off. . |
| 0165191 | 12/1985 | European Pat. Off. . |
| 389305 | 7/1965 | Fed. Rep. of Germany . |
| 1655950 | 9/1971 | Fed. Rep. of Germany . |
| 1337291 | 4/1963 | France . |
| 2399201 | 3/1979 | France . |
| 2491287 | 4/1982 | France . |
| 2509117 | 1/1983 | France . |
| 1132647 | 11/1968 | United Kingdom . |

Primary Examiner—Bruce M. Kisliuk
Attorney, Agent, or Firm—Oblon, Spivak, McClelland, Maier & Neustadt

[57] ABSTRACT

A haymaking machine provided with at least one rotor (5) driven in rotation has a drive housing (12) equipped with two gears which mesh with one another and have different diameters and different numbers of teeth. Each of the gears is connected to a shaft extending out of housing (12) and is able to be driven from power takeoff shaft (11) of the tractor. A third gear is provided with a driven shaft (23) and is able to be connected to rotor (5). The third gear able to be meshed with one or the other of the two above-mentioned gears.

12 Claims, 3 Drawing Sheets

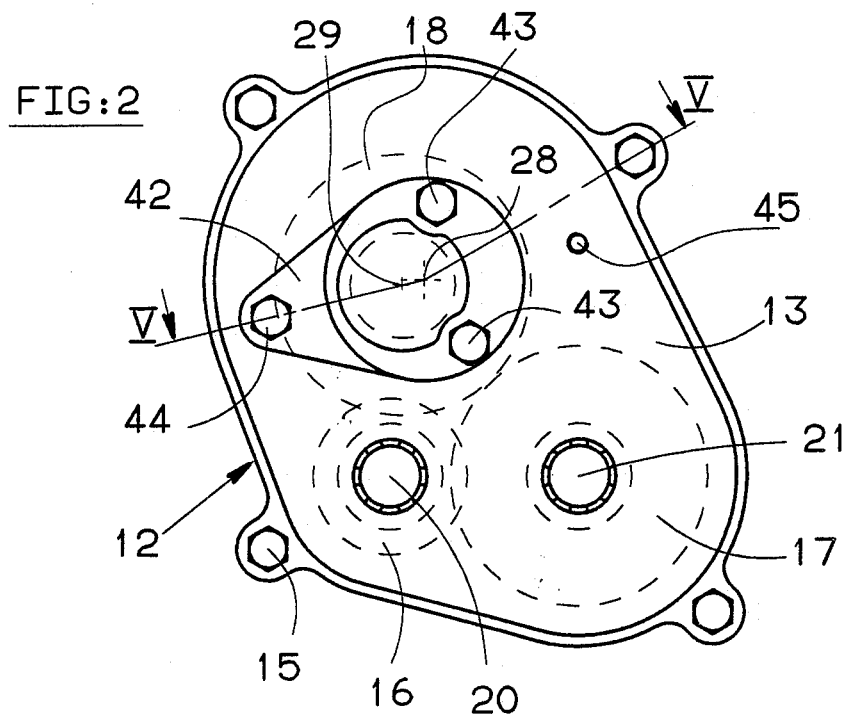
FIG:2
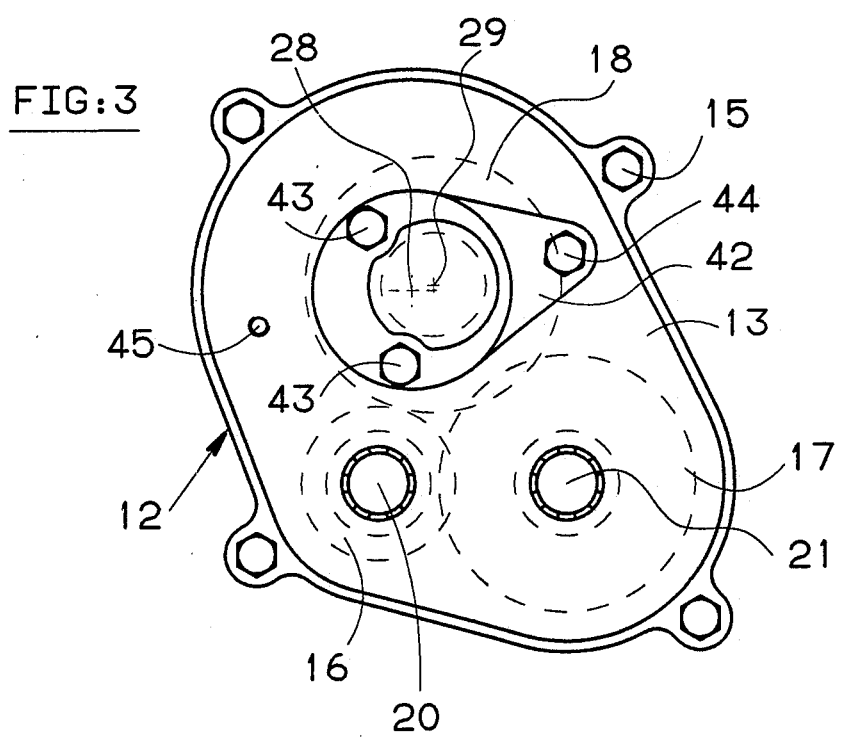
FIG:3

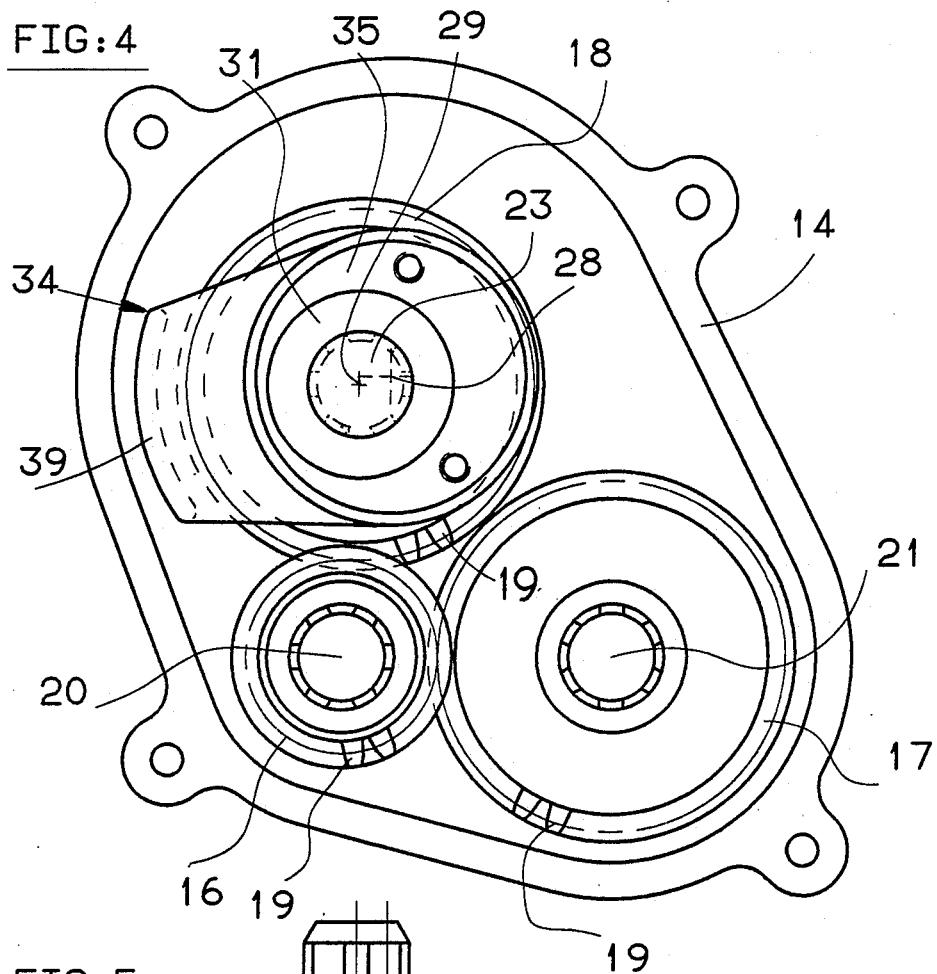
FIG:4
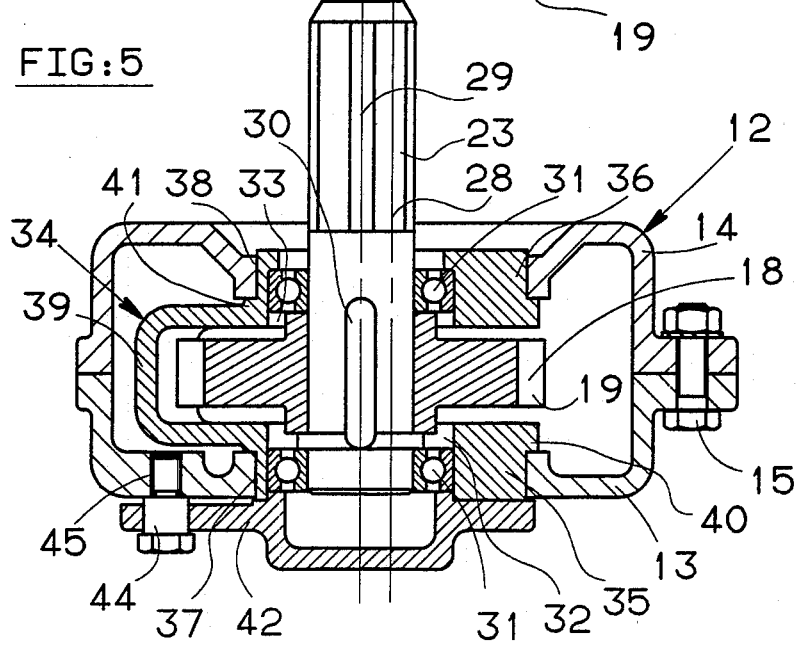
FIG:5

TRACTOR DRIVEN FARM MACHINE

BACKGROUND OF THE INVENTION

1. Field of the Invention:

This invention relates to a farm machine, particularly for haymaking, comprising a frame supporting at least one rotor driven in rotation during work around an approximately vertical axis, said driving being performed from the power takeoff shaft of a tractor.

2. Discussion of the Background Art:

Machines of this type, which are equipped with a rotor for windrowing plants lying on the ground, should be able to be coupled both to the front and back of tractors. When the windrower is in front, it is possible to couple a second machine, for example a bailer or a silo filler, to the back so as to perform two operations simultaneously. Another advantage of mounting the windrower in front is that the tractor wheels do not run over the strewn hay.

However, a great obstacle to the general use of couplings to the front of tractors comes from the fact that the speeds and directions of rotation of the front power takeoff shafts differ according to the tractor models. On some models, said shafts rotate at 1000 rpm while on other models they rotate at 540 rpm. In addition, on some tractors the front power takeoff shafts rotate to the right, while on others they rotate to the left.

Users who want to put their machines at the front of tractors are obliged, in most cases, to use reducing or reversing housings or, at times, both. These housings must then be placed between the power takeoff shaft and the rotor of the machine. These housings constitute relatively expensive independent devices. Further, it is necessary to remove them from the machines when they are not used for driving, which forces the user to provide space to store them.

Finally, such reducing housings must also be used to drive machines coupled to the rear of tractors having only a rear power takeoff rotating at 1000 rpm.

SUMMARY OF THE INVENTION

This invention has as an object to the elimination of the above drawbacks.

A further object is to provide, at a lower cost, a machine with at least one rotor able to be driven in the desired direction and at a desired speed from any front or rear power takeoff shaft of a tractor.

For this purpose, an important characteristic of the invention consists in that the machine is equipped with a drive housing containing two gears which mesh and have different diameters and different numbers of teeth and each of which is connected to a shaft extending out of the housing and is able to be driven from the power takeoff shaft of the tractor. The housing also contains a third gear which is provided with an output shaft able to be connected to the rotor, said third gear being able to be made to mesh with one or the other of the two above-mentioned gears.

The two gears which can be driven from the power takeoff shaft have a plurality of teeth which differ in ratio such that when the speed of rotation of one is on the order of 1000 rpm, the speed of rotation of the other is about 540 rpm.

This arrangement makes it possible to drive the rotor or rotors of the machine correctly, whether at the front or rear of the tractor, using only a single housing with only three gears. Actually, it is possible to maintain practically the same speed of rotation of the third gear, and consequently of the rotor or rotors, by connecting the power takeoff shaft of the tractor to the input shaft of the gear having the smallest diameter if it rotates at 1000 rpm and, inversely to the input shaft of the gear which has the greatest diameter if it rotates at 540 rpm.

On the other hand, regardless of the direction of rotation of the power takeoff shaft, it is possible to maintain the same direction of rotation of the third gear and therefore of the rotor or rotors. For this purpose, it suffices to mesh this third gear directly with the gear whose drive shaft is connected to the power takeoff shaft if the direction of rotation of the latter is to be reversed, or else mesh it with the other gear if the direction of rotation given by the power takeoff shaft is to be maintained. In the latter case the second gear changes the direction of rotation of the third gear but not its speed of rotation.

According to another characteristic of the invention a torque limiter is provided on the transmission shaft connecting the output shaft of the third gear of said housing to the rotor. Thanks to this arrangement, the limiter does not undergo any change of direction or speed of rotation which could alter its functioning.

BRIEF DESCRIPTION OF THE DRAWINGS

Other characteristics of the invention will come out from the claims and description below of a nonlimiting example of embodiment of the invention with reference to the accompanying drawings in which:

FIG. 2 is, on a larger scale, a front view of the transmission housing in a first position, FIG. 3 is a view similar to that of FIG. 2, of the transmission housing in a second position;

FIG. 4 is a front view of the transmission housing without the front housing part; and FIG. 5 is a sectional view taken along plane V—V of FIG. 2.

DETAILED DESCRIPTION OF THE PREFERRED EMBODIMENT

Figure 1:
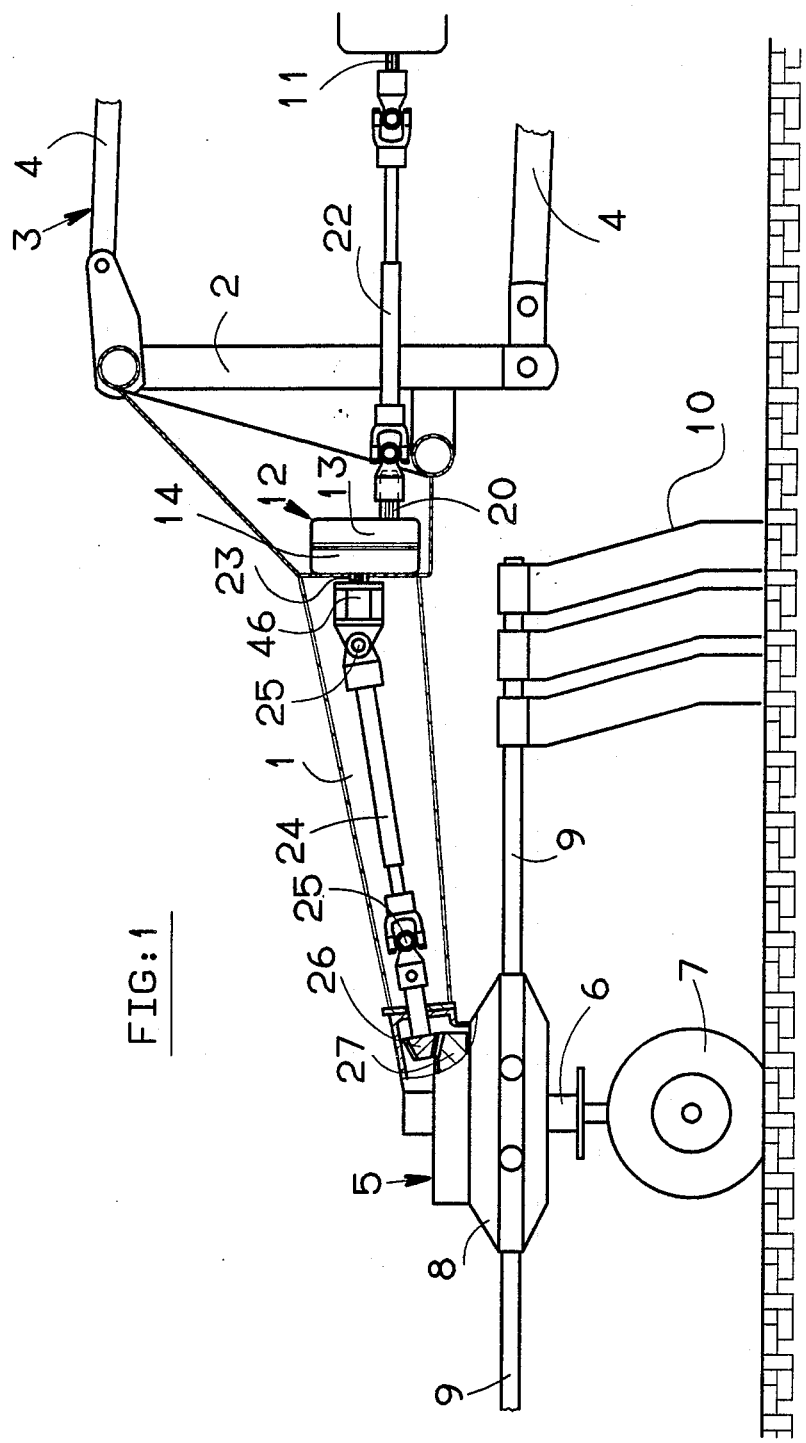
FIG. 1 is a side view, in partial section, of a machine according to the invention.

As seen from FIG. 1, the invention will be described in connection with a haymaking machine intended for windrowing of plants. This machine has a beam-shaped frame (1). At one of its ends, the frame carries a coupling bracket (2) used for hitching the machine to lifting device (3) of a driving tractor (not shown). The connection between the machine and the tractor is provided by means of connecting rods (4). This hitching can be made at the rear side or else the front side of the tractor, if the latter is equipped accordingly.

At its other end, frame (1) carries a rotor (5) which can be driven in rotation, during work, around an approximately vertical central pin (6) having a vertical axis. This pin (6) is connected to frame (1) and carries, at its lower end, support wheels (7) which roll over the ground during work. Rotor (5) is made up of a rotating hub (8) which carries arms (9) which extend outward. Each of these arms (9) carries tools in the form of forks (10) which move the plants lying on the ground. Arms (9) also have, in a way known in the art, at their ends located in hub (8), cranks provided with rollers which move in a control cam connected to central pin (6). The profile of this cam is such that, on the front part of their path, forks (10) are directed downward and gather the plants while on the lateral part of their path, they are lifted and deposit the plants in the form of a windrow.

On this machine, the control cam can be turned relative to, or with, central pin (6) as a function of the direction of movement. This makes it possible to adjust the control of the arms (9) so that the part of the path over which tools (10) is directed downward is always located in front, when seen in the direction of movement.

Rotor (5) is driven in rotation from power takeoff shaft (11) of the tractor. The transmission means which go from shaft (11) to rotor (5) is partially housed in frame (1). These means comprise a transmission housing (12) which is bolted to frame (1). As seen in FIGS. 2 to 5, this housing (12) consists of two parts (13, 14) in the shape of covers which are assembled by bolts (15). The housing contains three gears (16, 17, 18). Two of these gears (16 and 17) are located side by side and mesh. They have different diameters and different numbers of teeth (19), and in such a ratio that when the speed of rotation of first gear (16), which has the smallest number of teeth (19), is on the order of 1000 rpm, the speed of the second gear (17) is about 540 rpm. By way of example, gear (16) has sixteen teeth (19) and the second gear (17) has twenty nine teeth (19). This ratio was selected because it makes it possible to maintain the speed provided by power takeoff shaft (11) if it is 540 rpm, or else reduce it to this value if the speed of shaft (11) is 1000 rpm. Other ratios could be selected if the power takeoff shafts rotate at speeds other than those cited. Also, other ratios could be selected if the two possible speeds of the power takeoff shafts have to be brought to another speed to drive the rotor.

Each of these two gears (16, 17) is respectively connected to a first or second drive shaft (20, 21) extending out of housing (12). These shafts (20 and 21) are journalled in bores provided in housing parts (13) and (14) by means of ball bearings. The end of each shaft (20) or (21) which is located outside housing (12) can be connected to power takeoff shaft (11) of the tractor by means of an input shaft (22) having universal joints.

Third gear (18) is located above the other two gears (16) and (17). It is mounted on a driven shaft (23) which extends out of housing (12) on the side opposite to that on which shafts (20) and (21) are located. This driven shaft (23) is connected to rotor (5) by a transmission shaft (24) having universal joints (25). The end of transmission shaft (24) which is directed toward rotor (5) has a pinion (26) which meshes with a ring gear (27) integral with hub (8) of rotor (5). The ratio between pinion (26) and ring gear (27) determines the speed of rotation of rotor (5).

The third gear (18) can be made to mesh with one or the other of said two gears (16) and (17) (see FIGS. 2 and 3). For this purpose, as seen in FIGS. 4 and 5, it is made integral with driven shaft (23) by a key (30). This shaft (23) is mounted by ball bearings (31) in bores (32) and (33) of a casing (34). The latter is made up of two rings (35) and (36) which are journalled in bores (37) and (38) provided in housing parts (13) and (14). These two rings (35) and (36) are connected together by a bridge (39) which straddles gear (18). They are stopped in the axial direction by shoulders (40) and (41). It is seen in FIG. 5 that bores (32) and (33), in which shaft (23) with gear (18) is guided, are eccentric relative to the outside peripheries of rings (35) and (36) and to bores (37) and (38) in which the rings are housed. As a result, a rotation of 180° of casing (34) in bores (37) and (38) around geometric axis (28), which is eccentric to the rotational axis of driven shaft (23), causes a lateral movement in an arc of a circle of shaft (23) and gear (18). This movement makes it possible to mesh this third gear (18) with one or the other of the two gears (16) and (17).

Casing (34) also has an operating lever (42) which extends outside housing (12). This lever (42) is fastened to ring (35) by means of two bolts (43). In addition a locking screw (44) is provided which makes it possible to stop lever (42) and consequently casing (34), in the positions in which third gear (18) meshes with one or the other of the two gears (16) and (17). For this purpose, housing part (13) has two tapped holes (45) in which locking screw (44) can be introduced.

In the example shown, third gear (18), which is integral with driven shaft (23), has the same diameter and the same number of teeth (19) as gear (17) integral with drive shaft (21). However, the ratio between gear (18) and the two other gears (16) and (17) could be different from that indicated above. This ratio has no effect in matching between the two speeds of the power takeoff shafts of tractors.

As is also seen from FIG. 1, between driven shaft (23) and rotor (5) there is provided a torque limiter (46). It is connected directly on shaft (23) and is connected to transmission shaft (24) through a universal joint (25). This torque limiter (46) is itself well known, e.g., a slip clutch, and has the function of interrupting the transmission of drive movement between power takeoff shaft (11) and rotor (5) when the torque becomes too great, as can occur when an arm (9) of rotor (5) encounters an obstacle. Since the torque limiter is positioned between the housing (12) and the rotor (5) the speed at which the torque limiter (46) rotates and its direction of rotation are always the same. This enables it to be effective both when power takeoff shaft (11) of the tractor used rotates at 540 rpm and at 1000 rpm.

During working operation, the machine is moved by means of the tractor. Rotor (5) is then driven in rotation via power takeoff shaft (11) of the tractor. If the shaft (11) rotates at 540 rpm, and if this is the desired rotational speed of the transmission shaft (24), shaft (22) must be connected to drive shaft (21) of second gear (17). Third gear (18), driven shaft (23) and transmission shaft (24) then also rotate at this same speed so long as gear (18) meshes with either gear (16) or (17).

The direction of rotation of the third gear (18) can also be changed to cause rotor (5) to rotate in the appropriate direction. Thus, if power takeoff shaft (11) rotates in the direction in which transmission shaft (24) is supposed to rotate, third gear (18) must be made to mesh with gear (16) which will act as an intermediate gear (see FIG. 2). On the other hand, if power takeoff shaft (11) rotates in the opposite direction of that in which transmission shaft (24) is supposed to rotate, third gear (18) must be made to mesh directly with gear (17). In this case, a reversing of the direction of rotation is obtained (see FIG. 3).

On the other hand, if power takeoff shaft (11) of the tractor rotates at 1000 rpm, and if the desired 4 rotational speed of the shaft (24) is 540 rpm, input shaft (22) must be connected to drive shaft (20) of first gear (16). This gear (16) then drives third gear (18) at a speed reduced to 540 rpm. This driving of third gear (18) can performed either directly or via gear (17) as a function of the desired direction of rotation. As in the preceding case, third gear (18) can be made to mesh with gear (16) if it is desired to reverse the direction of rotation given by power takeoff shaft (11) of the tractor or else with gear (17) if it is desired to maintain the same direction of rotation.

This housing (12) thus enables the user to adjust, by extremely simple maneuvers, the speed and direction of rotation of rotor (5) so that he can drive the machine with any model of tractor.

Of course, the invention is not limited to the embodiment described above and represented in the accompanying drawings. Modifications remain possible, particularly from the viewpoint of the constitution of the various elements or by substitution of technical equivalents without thereby going outside the field of protection.

What is claimed as new and desired to be secured by Letters Patent of the United States is:

1. A farm machine having tool means to be rotatably driven by a power takeoff shaft of a tractor, comprising:
    a frame connectable to the tractor;
    rotatably drivable tool means mounted relative to said frame; and
    means for transmitting rotational drive from said power takeoff to said tool means, comprising:
        (a) a transmission housing mounted to said frame,
        (b) first and second drive shafts journalled to said housing,
        (c) first and second meshing gears positioned in said housing and respectively mounted on said first and second drive shafts, said first and second gears having different diameters and a different number of teeth,
        (d) an input shaft having one end connectable to the power takeoff shaft of the tractor and another end selectively connectable to portions of one of said first and second drive shafts located outside of said transmission housing,
        (e) a third gear rotatably held in said housing by a driven shaft,
        (f) transmission means for drivingly connecting said driven shaft to said tool means, and
        (g) means for selectively meshing said third gear with one of said first and second gears, wherein said means for selectively meshing comprises eccentric means for journalling said driven shaft to said housing and means for rotating said eccentric means such that said third gear moves between said first and second gears when said eccentric means is rotated,
    whereby said tool means may be driven at a desired rotational speed by connecting said input shaft to a selected one of said drive shafts, and whereby said tool means may be rotatable driven in a desired direction by meshing said third gear with one of said first and second gears.

2. The machine of claim 1 wherein said tool means includes a rotor rotatable about a substantially vertical axis.

3. The machine of claim 2 wherein a gear ration of said first and second gears is 1000/540.

4. The machine of claim 3 wherein said first gear has sixteen teeth and said second gear has twenty nine teeth.

5. The machine of claim 1 wherein
    said means for rotating said eccentric means comprises means for moving said third gear between said first and second gears when said eccentric means is rotated by 180°.

6. The machine of claim 1 wherein said second and third gears have an equal number of teeth.

7. The machine of claim 5 wherein said eccentric means comprises:
    two rings mounted to said housing for rotating about an axis eccentric to a rotational axis of said driven shaft; and
    a bridge connecting said rings.

8. The machine of claim 7 wherein said eccentric means further comprises a lever fixed to one of said rings and extending externally to said housing.

9. The machine of claim 8 including means for locking a rotational position of said lever.

10. The machine of claim 9 wherein said locking means comprises a screw extending through said lever and insertable in one of at least two bores in said housing.

11. The machine of claim 10 wherein said transmission means for drivingly connecting said output shaft to said tool means comprises a transmission shaft.

12. The machine of claim 11 including a torque limiter positioned between said transmission shaft and said driven shaft.

* * * * *

UNITED STATES PATENT AND TRADEMARK OFFICE
CERTIFICATE OF CORRECTION

PATENT NO. : 4,953,346
DATED : SEPTEMBER 4, 1990
INVENTOR(S) : JEROME ARON

It is certified that error appears in the above-identified patent and that said Letters Patent is hereby corrected as shown below:

On the title page:

In the Foreign Application Priority Data, please delete "JAPAN" as the country and insert --FRANCE--;

In the Foreign Patent Documents, please delete "Fed. Rep. of Germany" and insert --SWITZERLAND-- for 389305 7/1965.

In Column 6, Claim 3, Line 1, delete "ration" and insert --ratio--.

Signed and Sealed this

Twenty-fifth Day of August, 1992

Attest:

DOUGLAS B. COMER

*Attesting Officer*  *Acting Commissioner of Patents and Trademarks*